(12) United States Patent
Monteyne

(10) Patent No.: US 11,751,510 B2
(45) Date of Patent: Sep. 12, 2023

(54) BALING MACHINE INCLUDING AN OPERATIONAL STATUS DETECTOR

(71) Applicant: CNH Industrial America LLC, New Holland, PA (US)

(72) Inventor: Niklaas G. C. Monteyne, Blankenberge (BE)

(73) Assignee: CNH Industrial America LLC, New Holland, PA (US)

(*) Notice: Subject to any disclaimer, the term of this patent is extended or adjusted under 35 U.S.C. 154(b) by 836 days.

(21) Appl. No.: 16/577,881

(22) Filed: Sep. 20, 2019

(65) Prior Publication Data

US 2020/0093067 A1    Mar. 26, 2020

(30) Foreign Application Priority Data

Sep. 20, 2018 (BE) .................................. 2018/5643

(51) Int. Cl.
*A01F 15/07* (2006.01)
*B30B 9/30* (2006.01)

(52) U.S. Cl.
CPC ........ *A01F 15/0715* (2013.01); *B30B 9/3007* (2013.01); *A01F 2015/076* (2013.01); *A01F 2015/077* (2013.01)

(58) Field of Classification Search
CPC .......... A01F 15/0705–0715; A01F 2015/0745; A01F 2015/076
See application file for complete search history.

(56) References Cited

U.S. PATENT DOCUMENTS

2010/0236191 A1* 9/2010 Paillet ................. A01F 15/0715
53/210
2016/0355292 A1* 12/2016 Wigdahl ............. A01F 15/0715

FOREIGN PATENT DOCUMENTS

| EP | 1310152 A1 | 5/2003 |
|---|---|---|
| EP | 1310154 A1 | 5/2003 |
| EP | 1479283 A1 | 11/2004 |
| EP | 2229810 A1 | 9/2010 |
| EP | 2250875 A2 | 11/2010 |
| EP | 2656726 A1 | 10/2013 |
| EP | 2786652 A1 | 10/2014 |
| EP | 2688390 B1 | 8/2015 |

OTHER PUBLICATIONS

Extended European Search Report for Application No. 19198396.4 dated Mar. 17, 2020 (five pages).

* cited by examiner

*Primary Examiner* — Chelsea E Stinson
(74) *Attorney, Agent, or Firm* — Peter Zacharias

(57) ABSTRACT

A baling machine including a bale-forming chamber for receiving plant matter and forming it into a bale. The bale-forming chamber includes one or more rotatable, bale-forming rollers and a feed mechanism for feeding a flexible wrapping material into the bale-forming chamber for wrapping a bale therein. The baling machine further includes an acoustic or vibration sensor that is configured for generating an output. The acoustic or vibration sensor generates an output signal that is characteristic of operation of the baling machine while wrapping material is being fed into the bale-forming chamber. The status of the output signal indicates whether the wrapping material is being wrapped onto the bale or around the one or more rotatable, bale-forming rollers.

16 Claims, 2 Drawing Sheets

BALING MACHINE INCLUDING AN OPERATIONAL STATUS DETECTOR

FIELD OF THE INVENTION

The invention relates to a baling machine including an operational status detector.

BACKGROUND OF THE INVENTION

As is well known, baling machines are widely used in agriculture to bale plant matter in fields into bales that may be conveniently and effectively handled, stored and used. Baling machines are known that bale forage products such as grass and other leaves used as animal feed; straw or other plant parts resulting as by-products from a harvesting operation such as combine harvesting; cotton; and other plant parts of commercial or other value.

A large baler may be a self-propelled machine having an engine, transmission, drive train, powered wheels, steerable wheels and an operator's cab. The majority of baling machines in use in Europe however are not autonomous in this way and instead are of kinds intended to be towed behind an agricultural tractor that, under the control of an operator or using operator-monitored software, moves the baling machine about a field and provides power to operate internal parts of the baling machine. The latter is effected by way of a power take-off shaft connected to the power take-off that typically is part of the tractor.

The invention relates to autonomous and towed baling machines that are intended to produce so-called round bales. Such baling machines are referred to herein as "round balers".

In general as a round baler moves about a field, either as a result of being towed or under its own power depending on the precise baler design, it ingests plant matter lying in the field in front of the baler into a bale-forming chamber. Inside the bale-forming chamber various reciprocating parts form the plant matter into a cylindrical bale of tightly compacted plant matter parts. The plant matter is fed via an infeed path inside the baler that terminates in an inlet, typically at a lowermost point of the bale-forming chamber, through which the plant matter enters the bale-forming chamber.

The reciprocating parts may be constituted by e.g. a pair of oppositely disposed, endless, flexible belts that are wrapped around sets of powered rollers extending transversely across the bale-forming chamber adjacent its inner walls. The rollers are powered to rotate in a co-ordinated manner and thereby cause the belts to move following concavely curved paths approximating to the shapes of the inner walls of the bale-forming chamber. The motion of the belts induces a circular motion in the plant matter in the bale-forming chamber, causing it to form into the required dense cylinder as more and more plant matter is fed into the bale-forming chamber.

In an alternative design of bale-forming chamber transversely extending, powered rollers are used without having belts fed around them. In such an arrangement the rollers are powered to rotate and this induces the circular motion of the plant matter. The rollers typically include grooves or flutes that extend longitudinally along the rollers (and hence transversely across the bale-forming chamber). The grooves or flutes help to entrain the plant matter as the rollers rotate, thereby causing it to follow the circular motion that results in the formation of a round bale.

Many bale-forming chambers may be expanded by pivoting the outer shell of the chamber about horizontal-axis hinges formed in the panels defining the chamber. Such expansion of the chamber is useful when it is desired to eject a completed bale from the baling machine since an upper section and rearmost wall of the shell can be pivoted upwardly away from the bale. This permits the completed bale to be ejected rearwardly from the bale-forming chamber.

Round balers are known in which the mechanism for forming the bales is a mix of endless belt and roller entrainment mechanisms. The invention also is applicable in such designs of baler.

It is commonplace for a round baler such as that to which the invention pertains to include a bale-wrapping mechanism. This dispenses a web or net of flexible plastic wrapping material, of approximately the width of the bale-forming chamber, via an inlet into the bale-forming chamber for wrapping tightly around the bale after it has been formed. Since the bale occupies most of the width of the bale-forming chamber the resulting wrap encircles the bale from one end to the other.

In some designs of baler, again to which the invention pertains, a turntable for the bale is provided for rotating the bale during the wrapping phase. This allows the dispensing of wrapping material onto the bale in mutually orthogonal directions in order sequentially to wrap the bale end-on and sideways-on.

The wrapping stage often is a very important step in the formation of a round bale. Without the wrap, and in the absence of a twine-tying step, there would be little other than the compression and mixing together of the plant parts inside the bale-forming chamber to hold the bale together, maintain its integrity and thereby permit its ready handling using farm equipment.

When the wrap is of a continuous flexible plastic web type it moreover assists in the storage of various plant parts, especially forage, in round bale form since it helps to control the evaporation of moisture from the plant parts; it prevents unwanted moisture ingress; and it can promote the controlled fermentation of the plant material which is desired in many cases. Such a wrap also helps to prevent dust or chemical contamination of the bale e.g. when it is lying in a field, and furthermore deters bacterial, insect/larva and vermin infestations.

Regardless of the precise type of wrapping material employed the wrapping material may tear or become misfed as it enters the bale-forming chamber. In such a case the wrapping material can become entrained around one or more of the rollers as they rotate.

Since the rollers are rotating at high speed such entrainment of the wrapping material rapidly results in a substantial amount of it becoming wrapped around the roller, at the expense of no wrapping material being applied to the bale.

The integrity of an un-wrapped bale is poor, yet the first an operator of the tractor may know that a wrapping failure has occurred is when the bale forming chamber is opened to discharge what is thought to be a completed bale. At this point the bale is likely to fall apart and become clogged in the internal parts of the baling machine.

The operator then must cease baling operations and spend a considerable amount of time cutting and pulling the bale material (plant matter) from the inside of the baling machine. Even if the bale does not collapse entirely it is difficult to remove it since any attempt to lift the bale typically causes it to break up, again requiring time-consuming clearing of the inside of the baling machine.

When a wrapping failure occurs it also is necessary manually to cut the wrapping material from the roller around which it has become wrapped. This too is a time-consuming and unrewarding activity.

The plant matter removed as explained from the baling machine must then be passed again through the baling machine for baling, in order to avoid wastage. The plant matter however may be damaged as a result of the repeated handling it undergoes; and when it is re-baled its density may differ from other plant matter in the field. These factors can adversely affect the quality of bales formed from plant matter that has been cleared from the baling machine following a wrapping failure.

In a severe case of mis-feeding of wrapping material damage to parts of the baling machine may occur.

The invention seeks to solve or at least ameliorate one or more problems of the prior art.

EP 2786652 A1 discloses apparatus within a baler for measuring the wrap applied to a round bale and determining when the wrap is correctly applied to a bale. The wrapping process disclosed on EP 2786652 A1 is a two-stage process. The second stage of the process is initiated when the apparatus indicates through measurement that the first stage has been correctly completed. An alarm is provided to indicate whether the wrap is on at least one of the first edge and the second edge of the forming bale.

EP 1310154 A1 discloses a light beam sensor system for a bale-wrapping machine that indicates when the wrapping material is torn or has been used up so there is a discontinuity in the web of material.

EP 2688390 A1 discloses a pressure transducer that is configured to detect the outward pressure exerted by the bale in the bale-forming chamber during dispensing of the wrapping material. A reduction in the outward pressure is deemed to represent correct wrapping of the bale. A failure to detect the pressure reduction a predetermined time after commencement of the dispensing of wrapping material is deemed to indicate a failure correctly to wrap the bale.

EP 2656726 A1 discloses an optical monitoring system for determining whether correct bale wrapping has occurred; whether wrapping material has run out or become torn; and whether wrapping of wrapping material around unintended parts of the baling machine has occurred.

EP 2250875 A2 discloses an emitter-detector sensor arrangement for sensing incomplete bale wrapping.

SUMMARY OF THE INVENTION

According to the invention in a broad aspect there is provided a baling machine comprising a bale-forming chamber for receiving plant matter and forming it into a bale, the bale-forming chamber including one or more rotatable, bale-forming rollers and/or one or more bale-forming belt; and a feed mechanism for feeding a flexible wrapping material into the bale-forming chamber for wrapping a bale therein, wherein the baling machine includes an acoustic or vibration sensor that is capable of generating an output, the acoustic or vibration sensor sensing a waveform while wrapping material is being fed into the bale-forming chamber, and the output of the acoustic or vibration sensor indicating one or more of whether wrapping material (i) is being wrapped onto a said bale and (ii) is the subject of a wrapping failure, wherein one or more said bale-forming roller and/or one or more said bale-forming belt includes a series of plant matter-engaging external protrusions supported at regular intervals about an external periphery; and wherein the acoustic or vibration sensor is capable of sensing a waveform generated using the external protrusions at a frequency or in a frequency range or at an amplitude or in an amplitude range that is characteristic of acceptable wrapping or wrapping material onto a said bale.

Such an arrangement is of benefit inter alia in embodiments in which a change of the detected waveform is used to indicate that a wrapping failure or error has occurred. As a non-limiting example, the speed of rotation of a roller and the spacing of protrusions on it may be parameters that give rise to an "acceptable wrapping" frequency range or, more preferably, amplitude of the detected waveform that indicates successful wrapping of a bale. If the frequency or amplitude of the detected waveform goes outside the acceptable wrapping range because of a wrapping failure this may be used, as described herein in example embodiments, to generate a fault signal, an alert or a halt command.

The baling machine of embodiments described herein may be e.g. of any of the types discussed above, or of other designs.

In embodiments the baling machine may include a said bale-forming roller and the status of the output of the acoustic or vibration sensor indicating that the wrapping material is the subject of a wrapping failure is indicative of wrapping material being wrapped around a said bale-forming roller.

Also in embodiments a waveform at a frequency or in a frequency range or at an amplitude or in an amplitude range that is characteristic of successful wrapping is characteristic of engagement of the external protrusions with plant matter during feeding of wrapping material into the bale-forming chamber.

The acoustic or vibration sensor may be configured to operate in a number of ways. Thus for example the acoustic or vibration sensor may generate an output when it detects an acoustic or vibration waveform that is characteristic of correct wrapping of wrapping material around a bale. This output is an indication of successful wrapping of a bale. In this situation the absence of an output of the acoustic or vibration sensor may be interpreted as indicating a wrapping failure or error such as tearing or mis-feeding of the wrapping material.

In another embodiment the acoustic or vibration sensor may generate no output when detecting an acoustic or vibration waveform that is characteristic of correct wrapping of wrapping material, and may generate an output when this waveform ceases or changes. Ceasing or changing of the acoustic or vibration waveform may, depending on the precise arrangement of the baling machine, be interpreted as indicating a wrapping failure or error as exemplified above.

In another embodiment the acoustic or vibration sensor may generate one output (or type of output) when detecting an acoustic or vibration waveform that is characteristic of correct wrapping of wrapping material, and may generate a different output (or type of output) when this waveform ceases or changes in a manner that is characteristic of a wrapping failure or error.

A single sensor type such as a microphone may be used in embodiments as either an acoustic sensor or a vibration sensor. Alternatively the design of the sensor may be specific to whether it is intended to detect acoustic waveforms or vibration waveforms.

The baling machine of embodiments described herein provides numerous advantages over the prior art. One important advantage is that any change in the detected acoustic or vibration waveform caused by a wrapping failure occurs instantaneously. As a consequence the output of the acoustic or vibration sensor may very quickly—usually within milliseconds—become indicative of such a failure. This in turn allows the possibility of rapidly taking action to minimise the deleterious effects of the wrapping failure. Such action may include e.g. the sounding of an audible alarm within the hearing of a human operator, the generation of a warning message via a display, the transmission of a data signal e.g. externally of the baling machine and/or the generating of a command that halts bale-forming and/or wrapping activity in the baling machine. The generation of such a command advantageously may cause halting of wrapping activity before the adverse conditions mentioned above arise, thereby minimising the time and effort needed for remedial action.

In embodiments of the invention the sensor is "contactless", i.e. it does not have to be in contact with the wrapping material or even the interior of the bale-forming chamber in order to provide effective sensing.

The output of the acoustic or vibration sensor can be arranged in embodiments to indicate a wrapping failure regardless of whether this is caused by mis-feeding, tearing or running out of the wrapping material. This is a further advantage of the invention over the prior art, in which the nature of the sensing is limited.

In line with the foregoing, in embodiments disclosed herein preferably the acoustic or vibration sensor senses an acoustic or vibration waveform that is characteristic of wrapping material being wrapped onto a said bale and generates an output signal that is indicative of acceptable wrapping of a bale; or the acoustic or vibration sensor senses an acoustic or vibration waveform that is characteristic of wrapping material being wrapped onto a said bale and consequently generates no output signal, the absence of an output signal being indicative of acceptable wrapping of a bale.

In embodiments the acoustic or vibration sensor optionally senses an acoustic or vibration waveform that is characteristic of wrapping material being wrapped onto a said bale-forming roller and generates an output signal that is indicative of an error condition; or the acoustic or vibration sensor senses an acoustic or vibration waveform that is characteristic of wrapping material being wrapped onto a said bale-forming roller and consequently generates no output signal, the absence of an output signal being indicative of an error condition such as one of those described herein.

Typically the one or more bale-forming rollers has a fixed axis at least while bale-forming operations are taking place. The fixed axis in a typical baling machine extends horizontally from one transverse side of the bale-forming chamber to the other.

Conveniently the acoustic or vibration sensor includes or is connected to a filter that discriminates waveforms detected by the sensor in a frequency range indicative of wrapping of wrapping material onto a bale. Such a filter may be embodied in software, hardware or both software and hardware.

Preferably the series of external protrusions includes a series of elongate ribs. Typically such ribs extend longitudinally along the at least one roller.

Also preferably the baling machine includes a machine frame or a machine frame member that is directly or indirectly connected to the bale-forming roller(s) and on which the acoustic or vibration sensor is supported. Such an arrangement can be particularly beneficial in providing for contactless operation, since the waveform sensed by the acoustic or vibration sensor can be one that is transmitted via the material of the machine frame or machine frame member. This in turn allows the sensor to be located remotely of the bale-forming chamber, thereby isolating the sensor against damage that might be caused by the harsh environment in which the bales are formed.

Furthermore such an arrangement provides at least a partial filtering function since waveforms that are not transmitted via the machine frame or frame member are not sensed by the sensor. Thus for example airborne noise signals generated inside the bale-forming chamber may be filtered out by positioning the sensor on the machine frame or frame member.

Using a machine frame or frame member in this manner to provide a filtering function may amount to the sole filter employed to filter the waveforms detected by the acoustic or vibration sensor. Equally, it is possible and indeed likely that one or more further sensor, such as but not limited to an electronic or software sensor, is included in the baling machine.

In embodiments the acoustic or vibration sensor is operatively connected to a processor or circuit that processes an output signal of the acoustic or vibration sensor and generates one or more signals and/or commands in dependence on the output status of the acoustic or vibration sensor. In one embodiment the processor or circuit processes the absence of an output signal of the acoustic or vibration sensor and generates one or more signals and/or commands on detection of the absence of a said output signal. However other arrangements for interpreting the output(s) of the acoustic sensor or vibration sensor are possible within the scope of the invention.

In embodiments at least part of the processor or circuit is supported by or forms part of the baling machine; however in other embodiments part or all of the processor or circuit may be located remotely of the baling machine. Thus part or all of the processor or circuit may be located on the tractor that tows the baling machine. The processor or circuit and at least the acoustic or vibration sensor may in such an example be connected by way of a transmission cable or wirelessly depending on the precise component design.

In further embodiments the processor or circuit may be located e.g. in a fixed location or on a vehicle operating far away from the baling machine, with any of a range of signal and data transmission protocols (as will be known to the person of skill in the art) being available to permit communication between the acoustic or vibration sensor and the processor or circuit.

In yet further embodiments the acoustic or vibration sensor may include one or more comparators capable of comparing a non-wrap waveform, that is sensed while the baling machine is operational without wrapping material being fed into the bale-forming chamber, with a waveform sensed while wrapping material is being fed into the bale-forming chamber and generating one or more signals and/or commands in dependence on the comparison.

In such an embodiment the acoustic or vibration sensor may be capable of sensing or recording the non-wrap waveform during operation of the baling machine. However this is not a necessary feature of this embodiment. On the contrary the non-wrap waveform (or characteristic components or information forming parts of it) could be sensed and/or recorded separately from operation of the baling machine of the invention, as further explained herein.

BRIEF DESCRIPTION OF THE DRAWINGS

There now follows a description of preferred embodiments, by way of non-limiting example, with reference being made to the accompanying drawings in which.

DETAILED DESCRIPTION OF THE DRAWINGS

Figure 1:
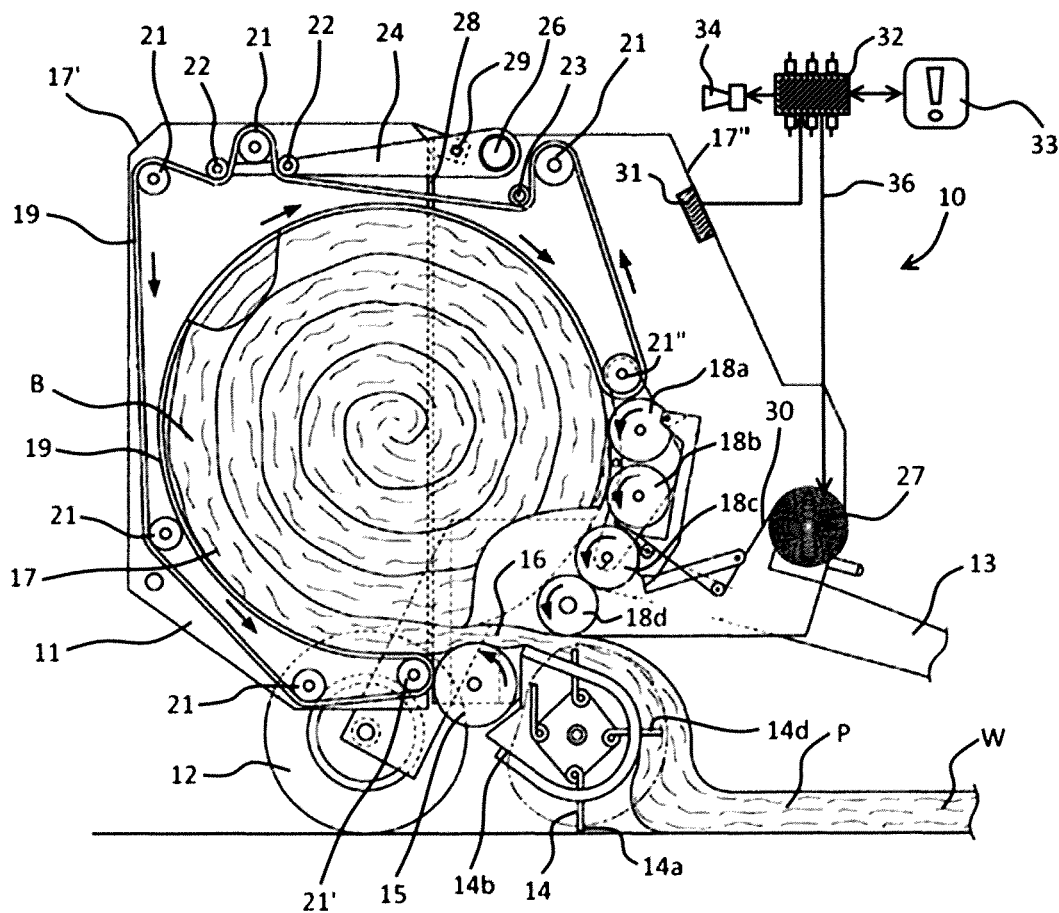
FIG. 1 is a schematic, vertically sectioned view of one form, of several, of round baler in which the invention may be employed.

Referring to FIG. 1 a round baler 10 includes a machine frame 11 supported for movement in a field on rotatable left and right ground-engaging, rotatable wheels, of which one wheel 12 is visible in the figure.

An in-use forward portion of the machine frame 11 supports and is rigidly fixed to a forwardly extending towing hitch 13. The towing hitch may be used in a conventional manner pivotably to connect the baling machine 10 to a towing tractor or other agricultural vehicle. As a result the baling machine 10 may be caused to travel over a field in which plant matter P is lying ready to be formed into bales.

A transversely extending, rotatable ground-level pick-up 14 for plant matter is positioned towards the in-use front end of the exterior of baler 10, adjacent a plant matter infeed 16 communicating with the interior of the baler 10. The pick-up 14 operates in a per se known manner, when the baling machine 10 is moving over a field as aforesaid, to rotate a number of pick-up tines 14a, 14b, 14c, 14d in a manner causing ingestion into the baler 10 of the plant matter that is to be baled. In many cases such plant matter P will be in the form of swaths or windrows W lying in the field and along which the baling machine may be caused to travel. However this need not necessarily be the case, and the baler 10 may be such as to operate in respect of other plant matter forms.

The pick-up 14 is arranged to feed plant matter collected by the pick-up 14 along the infeed 16 via a transversely extending infeed roller 15 that is powered to rotate as indicated by the arrow thereon into a bale-forming chamber 17.

Bale-forming chamber 17 is a large volume inside which formation of a bale of plant matter may be caused to occur. The bale-forming chamber 17 shown in FIG. 1 is of a kind in which a series of rotatable rollers 18a, 18b, 18c, 18d is arranged on one side of the bale-forming chamber in opposition to an endless flexible belt 19 that is movably located on an opposite side of the bale-forming chamber 17.

The rollers 18a, 18b, 18c 18d are mounted on a notional pitch arc that approximately corresponds to the shape of the forward side of the bale-forming chamber 17. The rollers 18a-18d extend parallel to one another spanning the bale forming chamber 17 from one lateral side to the other, and at least one of the rollers 18a-18d is powered to rotate in a rotational direction signified by arrows in FIG. 1.

The endless belt 19 extends about a series of belt rollers 21 and idlers 22, 23 such that the belt adopts the complex path illustrated. The belt rollers 21 and idlers 22, 23 are rotatably mounted and span the bale-forming chamber from side to side. At least one of the rollers 21 is powered to rotate. Such powered rotation of one or more of the rollers 21 causes movement of the belt 19 as indicated by the arrows in FIG. 1. The direction of movement of the belt 19 is complementary to the rotation of the rollers 18a-18d in the sense required for the forming of a bale B from the ingested plant matter P.

Two of the idlers 22 are mounted longitudinally spaced apart from one another on a tensioner arm 24 that is pivotably secured at a spring-biased pivot 26 to an upper wall of the bale-forming chamber. This arrangement allows for the belt 19 initially, at the start of forming of a bale B, to adopt an arc of relatively small radius between two of the belt rollers 21', 21".

In this situation the tensioner arm 21 protrudes into the interior of the bale-forming chamber. As a bale B forms its cylindrical diameter increases and this applies pressure to the belt 19. The radius of the arc of the belt 19 between the rollers 21', 21" increases during this process. This is accommodated by the tensioner arm 24 progressively moving to the position shown in FIG. 1 in which it lies generally parallel to the top wall of the bale-forming chamber 17. This permits an increasing length of the belt 19 to extend between the rollers 21', 21" as the diameter of the bale B increases.

Formation of the bale and the increase in its diameter to the full size illustrated in FIG. 1 result from the motions of the rollers 15 and 18a-18d; and the belt 19. Such motions cause the stream of plant matter P entering via the infeed 16 to become wrapped into round bale form as shown.

The baler 10 includes a feed mechanism for supplying bale wrapping material. In the illustrated embodiment this takes the form of a rotatable dispensing drum 27 on which bale-wrapping material having a width sufficient for wrapping of the bale B as described above is wound. The bale-wrapping material, which as noted can be a continuous web 30 or a flexible mesh or net, is dispensed from the dispensing drum onto the exterior of the bale when wrapping is required.

The precise mechanism for dispensing wrapping material may vary from one embodiment to another. Such variants are within the scope of the invention, and will be known to the person of skill in the art. For this reason they are not described herein in detail.

The walls of the bale-forming chamber are formed with an openable rear section 17' defined rearwardly of break line 28. The rear section 17' is secured to a front wall section 17" by way of a pivoting hinge 29 that extends from one side to the other of the baler 10 at the top of the bale-forming chamber 17. This arrangement permits selective upward pivoting opening of the rear section 17' to expose the formed, wrapped bale B in the chamber 17 and permit it to fall rearwardly out of the baler 10 in a per se known manner as the latter moves forwardly following completion and wrapping of the bale B.

Operation of the baler 10 is as indicated above, with forward movement of the baler 10, rotation of the pick-up 14 and rotation of the infeed roller 15 causing plant matter P to be fed into the bale-forming chamber 17. Here the action of the rollers 18a-18d and the belt 19 forms the bale B. When the bale B is of the correct size the wrapping material dispenser is activated to wrap the bale.

As explained however various forms of wrapping failure are known that include mis-feeding of the wrapping material 30 onto one of the exposed rollers 15 or 18a-18d, tearing of the wrapping material 30 or exhaustion of the supply of such material 30 on the dispensing drum 27.

Figure 2:
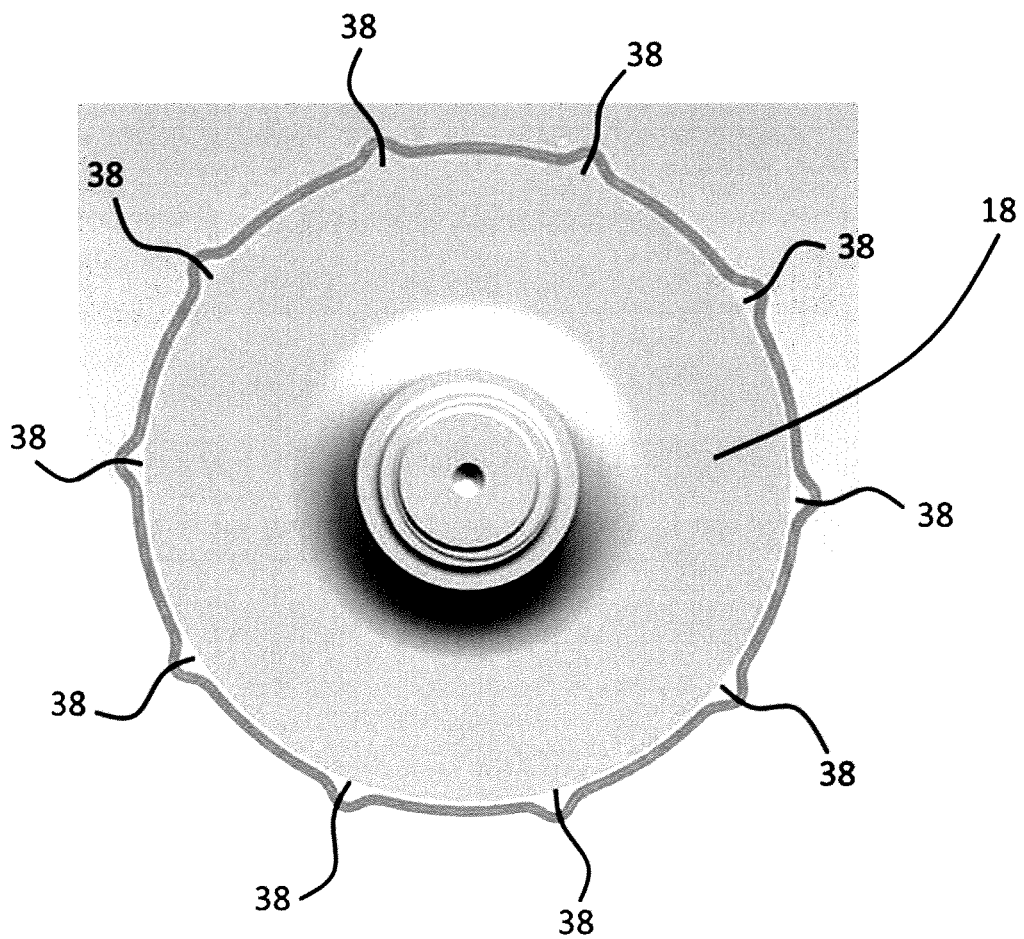
FIG. 2 is an end elevation view of a roller that may be employed in a baling machine such as that shown in FIG. 1.

At least one of the rollers 18a-18d, and in a typical embodiment all of them, includes a series of longitudinally extending, regularly spaced protrusions and/or recesses in the form of e.g. protruding ribs and/or defined by depressions. FIG. 2 illustrates a series of such protrusions 38 spaced at equiangular gaps about the outer circumference of a roller such as rollers 18a-18d of FIG. 1. In FIG. 2 the protrusions 38 extend from one end of the roller 18a to the other, and hence from one transverse side of the bale-forming chamber 17 to the other. Other forms of regularly spaced protrusion and recess combinations are known such as patterns of teeth or otherwise interrupted protrusions formed on the surface of one or more of the rollers. As noted such features also may be defined by recesses formed in the rollers.

The purpose of the protrusions and recesses is to grip or at least entrain the plant matter P as the rollers 18a-18d rotate and thereby promote the formation of the bale B.

It is also possible for the surface of the belt 19 to include regularly spaced protrusions and/or recesses that serve a similar purpose.

As mentioned in the prior art it is known to provide one or more operational status detectors or sensors in a baling machine; and such detectors may take the form of detectors of bale wrapping failures. As explained however the known arrangements for detecting wrapping failures are in one or more ways sub-optimal. Also as is apparent from study of the embodiment of FIG. 1 in some designs of baler there is virtually no space available for mounting a useable detector of wrapping failure adjacent the wrapping material dispenser as is a requirement in several of the prior art arrangements.

The inventors have discovered that bale-forming elements such as the rollers 18a-18d and/or the belt 19 that include regularly spaced protrusions and/or recesses generate characteristic waveforms when wrapping is taking place satisfactorily. Furthermore such bale-forming elements generate different, characteristic waveforms in the event of a wrapping failure occurring.

Such waveforms may be detected using appropriate sensors or detectors. This may give rise to a highly reliable status detector that (a) indicates a wrapping failure immediately after it commences and (b) that successfully can be positioned at a location that is remote from the point at which wrapping material is dispensed into the bale-forming chamber.

One embodiment of such a sensor is illustrated in FIG. 1.

In FIG. 1 an acoustic or vibration sensor such as (but not limited to) a microphone or other sensor 31 is capable of generating an electrical or electronic output signal on detection of a change in a waveform such as that resulting from the presence of the protrusions described above, the waveform arising as the rollers 18a-18d and/or the belt 19 move during wrapping operations.

Microphone or sensor 31 is illustrated secured to the interior front wall of the bale-forming chamber 17 but it could be located at a variety of alternative places on or in the baler 10. The microphone may be of a type that is activated by airborne sound pressure waves spreading from the rollers 18a-18d or the belt 19; or it could be a vibration detector that is activated by oscillation of the part of a frame, or machine frame member, forming part of the baler 10 and to which it is secured.

The microphone/sensor 31 is operatively connected to a processor and/or electronic circuit represented schematically by numeral 32. The processor/circuit 32 may take a variety of forms as will occur to the person of skill in the art. Moreover the processor/circuit 32 may be part of the baler 10 or it may be positioned remotely therefrom, such as in a towing tractor or other vehicle; or in a remotely located farm or other office.

FIG. 1 shows the microphone/sensor 31 connected by a cable to the processor/circuit 32, but various other connection methods, including wireless connection methods, are possible within the scope of the invention.

As indicated the status of the output of the microphone/sensor 31 may be used to indicate whether wrapping is taking place correctly. This may be achieved in a variety of ways.

Thus for example the microphone/sensor 31 may sense a waveform, generated as outlined above, that is characteristic of wrapping material being wrapped onto the bale B and the processor/circuit 32 may be arranged to generate an output signal that is indicative of acceptable wrapping. Such an output signal, that typically but not necessarily would be an electrical signal, could be transmitted to e.g. a display such as display 33 illustrated in FIG. 1. The display then could produce a visible indication of satisfactory wrapping of the bale B, with the disappearance or a change of the visible output being indicative of a wrapping failure.

In another embodiment the microphone/sensor 31 could sense a waveform that is characteristic of wrapping material being wrapped onto the bale B and consequently generate no output signal, the absence of an output signal being indicative of acceptable wrapping of a bale. This status of the microphone/sensor could be used by an appropriately programmed or connected processor/circuit 32 to generate a signal indicative of satisfactory wrapping; or, alternatively, the absence of such a signal may be so interpreted.

In yet a further embodiment the microphone/sensor 31 could sense a waveform that is characteristic of wrapping material being wrapped onto one of the rollers 18a-18d and generate an output signal that is indicative of a wrapping failure or error condition 1. In this case it would be appropriate for the display 33 to show a warning or alert such as that schematically illustrated in FIG. 1.

The processor or circuit 32 may be operatively (e.g. but not necessarily electrically) connected to an alarm sounder 34 or other audible means of generating an alert. This may be present in combination with a display such as display 33, or in the absence of a display.

Yet a further option is for the microphone/sensor 31 to sense a waveform that is characteristic of wrapping material being wrapped onto one of the bale-forming rollers 18a-18d and consequently generating no output signal, the absence of an output signal being indicative of a wrapping failure or error condition and the processor or circuit 32 being arranged to activate the display 33 or alarm sounder 34 (if present) as a result of the absence of a signal.

Another option within the scope of the invention is for the processor or circuit 32, or another processor or circuit operatively connected to the baling machine 10, to include a comparator. Such a feature may be embodied in hardware, e.g. as an Op-Amp circuit; or in software.

In such an embodiment the microphone/sensor may be capable of sensing or detecting one or more "non-wrap" waveforms arising when the baling machine 10 is operating to bale plant matter at a time when no wrapping material is being fed into the bale-forming chamber 17.

Such waveforms may then be compared, using the comparator, with waveforms sensed or measured while wrapping material such as material 30 of FIG. 1 is dispensed into the bale-forming chamber 17. The output of the comparison can be employed in the processor or circuit 32 to distinguish between "good" and "bad" (i.e. faulty or non-occurring) bale wrapping.

Embodiments of the invention including one or more comparators as described may be used to build a database of waveforms of the various described kinds, if desired in a variety of different designs of the baling machine 10. Such a database may be stored or programmed in the processor or circuit 32 and the appropriate non-wrap waveform for the baling machine 10 in question made available for comparison purposes while wrapping of bales B takes place. Such an arrangement does not need to detect any change in the waveform sensed or measured while wrapping is taking place, it being necessary only for the comparison to be made. In such an embodiment a certain output (or range of outputs) of the comparator may be deemed to represent "good" wrapping or the bale; and another comparison output (or range of outputs) "bad" wrapping. This may simplify the hardware employed and/or the process or assessing whether faulty wrapping is occurring.

Yet a further option is that one or more non-wrap waveforms may be recorded (or characteristic parameters of them recorded) separately from operation of the baling machine in which the comparator is installed. This may occur e.g. through operation of a "calibration" baling machine in which a microphone/sensor is capable of recording the non-wrap waveform or parts of it. The recorded non-wrap waveform or characteristics may then be programmed or otherwise made available in the processor or circuit 32 in a manner obviating any need for the baling machine 10 to be capable of sensing or measuring the non-wrap waveform.

In preferred embodiments the described apparatus employs the amplitude, sound pressure level or a similar indicator of acoustic energy as the parameter detected by the microphone/sensor 31. In such an embodiment variations in signal amplitude, etc., are the waveform changes made use of to indicate a transition from acceptable bale-wrapping to an error or fault condition.

In some variants of such embodiments the amplitude of a waveform characteristic of satisfactory wrapping has a greater amplitude or other energy level characteristic than when a wrapping error occurs. In other embodiments the opposite may be true, such that a wrapping failure or error generates a more energetic waveform. All such variants are within the scope of the invention.

In other embodiments other waveform parameters, such as but not limited to frequency or phase, may be detected and used as indicators of successful or unsuccessful bale wrapping. Such embodiments may include components or subsystems such as spectrum or frequency detectors or analysers; or phase detectors.

Other options for using the output of the microphone or other sensor 31 of the waveforms generated by the bale-forming parts of the baler 10 are also possible.

The components such as the display 33 and alarm sounder 34 may be parts of or supported by the baler 10, or they may (in like manner to the processor/circuit 32) be remote therefrom. Various connection means including wired and wireless connections are possible for operatively connecting these components together.

It is possible to include one or more input devices as part of an embodiment of the invention. Thus there may be provided controls such as keyboards and/or pushbuttons forming part of one or more of the processor/circuit 32, the display 33 or the alarm sounder 34. The display may be a touchscreen or similar device that additionally or alternatively may operate as an input device. Voice activated input devices are also possible.

The input device(s) may be used to input commands. These may include for example commands causing halting of dispensing of wrapping material when a wrapping failure is detected as explained.

Additionally or alternatively this function may be automated. This is illustrated schematically by the connection 36 of the processor 32 to the dispenser of wrapping material. Such connection 36 may be embodied in a variety of wired or wireless ways.

As explained, in embodiments of the invention in which the microphone/sensor 31 is positioned to be activated by vibration or oscillation of the machine frame 11 or a member forming part of the machine frame, a degree of filtering of the waveforms detected by the microphone/sensor 31 occurs. This is not least because waveforms propagating in air would not be detected in such an arrangement. Thus noise as may be generated by e.g. acoustic signals from nearby machines such as the towing tractor are less likely to give rise to false wrapping failure signals than if the microphone/sensor 31 was positioned to be activated by sound pressure waves.

Other filtering mechanisms may additionally or alternatively be employed. These may be physical and/or software filters.

Suitable physical filters include but are not limited to narrow band pass mufflers or similar components that permit only a desired frequency range/level to reach the operative parts of the microphone or sensor 31. Another option is to tune the natural frequency of the microphone or sensor 31 (or parts connected to it such as a machine frame member) so that resonance in preferred frequency ranges dominates the excitation of the microphone or sensor 31.

Yet a further possibility is for the operational frequency range of the microphone or sensor 31 to be chosen to be narrow, thereby limiting the range of frequencies it can detect.

The filter may be embodied electronically e.g. by way of a tuned resonator or an amplitude (or other level) filter forming part of the processor/circuit 32.

Another option is for the filter to be embodied in software forming part of the coding of the processor 32. Those of skill in the art will readily be able to embody such filters as are exemplified above.

The invention has been exemplified with reference to a round baler 10 the bale-forming chamber 17 of which includes a mixture of rollers 18 and an endless belt 19. However it is known to provide a second endless belt such as belt 19 in substitution of the rollers 18; or further rollers in substitution of the belt 19. It will be within the ability of the person of skill in the art to adapt embodiments of the invention to take account of such possibilities, that lie within the scope of the invention.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:
1. A baling machine comprising:
a bale-forming chamber for receiving plant matter and forming it into a bale, the bale-forming chamber including one or more rotatable, bale-forming rollers and one or more bale-forming belts;
a feed mechanism for feeding a flexible wrapping material into the bale-forming chamber for wrapping the bale therein; and
an acoustic or vibration sensor configured for:
generating an output indicating one or more of whether the wrapping material (i) is being wrapped onto the bale and (ii) is the subject of a wrapping failure; and
sensing a waveform while the wrapping material is being fed into the bale-forming chamber;
wherein one or more of the one or more bale-forming rollers and the one or more baling-forming belts includes a series of plant-matter-engaging external protrusions supported at regular intervals about an external periphery;

wherein the acoustic or vibration sensor is configured for sensing a waveform generated using the external protrusions at a frequency or in a frequency range or at an amplitude or in an amplitude range that is characteristic of acceptable wrapping of the wrapping material onto the bale; and wherein the acoustic or vibration sensor (a) is not positioned adjacent the feed mechanism and (b) is positioned remotely from a point at which the wrapping material is dispensed into the bale-forming chamber.

2. The baling machine according to claim 1, wherein the output is indicative of the wrapping material being wrapped around the one or more rotatable, bale-forming rollers.

3. The baling machine according to claim 1, wherein the waveform at a frequency or in a frequency range or at an amplitude or in an amplitude range that is characteristic of successful wrapping is characteristic of engagement of the external protrusions with plant matter during feeding of the wrapping material into the bale-forming chamber.

4. The baling machine according to claim 1, wherein the waveform is characteristic of the wrapping material being wrapped onto the bale, and the output is indicative of acceptable wrapping of the bale.

5. The baling machine according to claim 1, wherein the waveform is characteristic of the wrapping material being wrapped onto the one or more rotatable, bale-forming rollers, wherein the acoustic or vibration sensor is further configured to generate no output when material being wrapped onto the bale is sensed, the absence of the output being indicative of acceptable wrapping of the bale.

6. The baling machine according to claim 1, wherein the output is indicative of the wrapping failure or an error condition.

7. The baling machine according to claim 1, wherein the acoustic or vibration sensor senses the waveform that is characteristic of wrapping material being wrapped onto the one or more rotatable, bale-forming rollers or the one or more bale-forming belts and consequently generates no output, the absence of the output being indicative of the wrapping failure or an error condition.

8. The baling machine according to claim 1, wherein the acoustic or vibration sensor is connected to a filter that discriminates waveforms detected by the sensor in a frequency range indicative of wrapping of the wrapping material onto the bale.

9. The baling machine according to claim 1, wherein the series of external protrusions includes a series of elongate ribs.

10. The baling machine according to claim 1, further comprising a machine frame or a machine frame member that is directly or indirectly connected to the one or more rotatable, bale-forming rollers and on which the acoustic or vibration sensor is supported.

11. The baling machine according to claim 1, wherein the acoustic or vibration sensor is operatively connected to a processor or circuit that processes an output signal of the acoustic or vibration sensor and generates one or more signals in dependence on a status of the output signal of the acoustic or vibration sensor.

12. The baling machine according to claim 1, wherein the acoustic or vibration sensor is operatively connected to a processor or circuit that processes an output signal of the acoustic or vibration sensor and generates one or more signals in dependence on a status of the output signal of the acoustic or vibration sensor, and wherein the processor or circuit processes an absence of the output signal of the acoustic or vibration sensor and generates one or more signals on detection of the absence of the output signal.

13. The baling machine according to claim 1, wherein the acoustic or vibration sensor is operatively connected to a processor or circuit that processes an output signal of the acoustic or vibration sensor and generates one or more signals in dependence on a status of the output signal of the acoustic or vibration sensor, and wherein at least part of the processor or circuit is supported by or forms part of the baling machine.

14. The baling machine according to claim 1, further comprising one or more comparators configured for:
  comparing a non-wrap waveform that is sensed while the baling machine is operational without the wrapping material being fed into the bale-forming chamber, with a waveform sensed while the wrapping material is being fed into the bale-forming chamber; and
  generating one or more signals in dependence on the comparison.

15. The baling machine according to claim 10, wherein the waveform is an acoustic waveform originating and thus spreading from the external protrusions to the machine frame or the machine frame member.

16. The baling machine according to claim 10, wherein the waveform is a vibration waveform caused by an oscillation, generated by the external protrusions, of the machine frame or the machine frame member.

* * * * *